United States Patent
Zhao et al.

(10) Patent No.: US 9,007,557 B2
(45) Date of Patent: Apr. 14, 2015

(54) LIQUID CRYSTAL PANEL AND FABRICATING METHOD THEREOF AND DISPLAY

(71) Applicant: Beijing Boe Optoelectronics Technology Co., Ltd., Beijing (CN)

(72) Inventors: Chengtan Zhao, Beijing (CN); Tae Yup Min, Beijing (CN); Xu Chen, Beijing (CN); Haiyun Lin, Beijing (CN); Jingpeng Li, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 177 days.

(21) Appl. No.: 13/805,400

(22) PCT Filed: Oct. 23, 2012

(86) PCT No.: PCT/CN2012/083383
§ 371 (c)(1),
(2) Date: Dec. 19, 2012

(87) PCT Pub. No.: WO2013/067887
PCT Pub. Date: May 16, 2013

(65) Prior Publication Data
US 2014/0240648 A1    Aug. 28, 2014

(30) Foreign Application Priority Data
Nov. 8, 2011    (CN) .......................... 2011 1 0350190

(51) Int. Cl.
*G02F 1/1339*    (2006.01)
*G02F 1/1335*    (2006.01)
*G02F 1/1341*    (2006.01)
(52) U.S. Cl.
CPC ........ *G02F 1/133514* (2013.01); *G02F 1/1339* (2013.01); *G02F 1/1341* (2013.01); *G02F 1/133516* (2013.01)

(58) Field of Classification Search
USPC .......................... 349/153, 190, 154, 149–152
See application file for complete search history.

(56) References Cited

U.S. PATENT DOCUMENTS 7,692,756 B2 *  4/2010  Kim ............................. 349/156
7,808,600 B2 * 10/2010  Lee ............................. 349/153
(Continued)

FOREIGN PATENT DOCUMENTS

CN    1752824 A    3/2006
CN    1892303 A    1/2007
(Continued)

OTHER PUBLICATIONS

International Search Report mailed Jan. 31, 2013; PCT/CN2012/083383.
(Continued)

*Primary Examiner* — James Dudek
(74) *Attorney, Agent, or Firm* — Ladas & Parry LLP

(57) ABSTRACT

Embodiments of the present invention relate to a liquid crystal panel and a fabricating method thereof and a display. The liquid crystal panel comprises: an array substrate and a color filter substrate bonded by a first sealant, with a region surrounded by the first sealant between the array substrate and the color filter substrate forming a liquid crystal panel display region filled with liquid crystal. In addition, the liquid crystal panel further comprises: a liquid crystal buffer region, located at the outer side of the first sealant; a liquid crystal channel, through which the liquid crystal buffer region and the liquid crystal panel display region are connected; and a covering layer, covering at least a position where the liquid crystal channel connects with the liquid crystal panel display region.

13 Claims, 3 Drawing Sheets

(56) References Cited

U.S. PATENT DOCUMENTS

2007/0211202 A1 9/2007 Ishii et al.
2009/0015779 A1 1/2009 Ohashi

FOREIGN PATENT DOCUMENTS

| CN | 101034234 A | 9/2007 |
| CN | 102650771 A | 8/2012 |
| JP | 2001-006612 A | 1/2001 |
| JP | 2004-138808 A | 5/2004 |
| JP | 2008-233720 A | 10/2008 |
| JP | 4158890 B2 | 10/2008 |
| KR | 20030058769 A | 7/2003 |

OTHER PUBLICATIONS

First Korean Office Action dated Nov. 12, 2013; Appln. No; 10-2012-7032116.
Korean Notice of Allowance dated Mar. 20, 2014; Appln. No. 10-2012-7032116.
First Chinese Office Action dated Dec. 10, 2013; Appln. No. 201110350190.6.
International Preliminary Report on Patentability dated May 13, 2014; PCT/CN2012/083383.

* cited by examiner

LIQUID CRYSTAL PANEL AND FABRICATING METHOD THEREOF AND DISPLAY

FIELD OF THE INVENTION

Embodiments of the present invention relate to a liquid crystal panel and a fabricating method thereof and a display.

BACKGROUND OF THE INVENTION

A liquid crystal display is a flat panel display commonly used at present, in which a thin-film transistor liquid crystal display (TFT-LCD) is a mainstream product in liquid crystal displays.

A liquid crystal panel is an important component of a liquid crystal display. In the prior art, a method for fabricating a liquid crystal panel may comprise the following processes: through a liquid crystal one-drop-filling (ODF) process, dropping liquid crystal on any one of the array substrate and the color filter substrate; applying a sealant on the other substrate; then bonding the array substrate and the color filter substrate, and performing curing treatment on the sealant to make the sealant cured, so that a liquid crystal panel is formed.

During designing and fabricating a liquid crystal panel, there are very strict requirements on a cell thickness. Usually, a cell thickness of a liquid crystal panel is about 3.5 um, and a cell thickness fluctuation of 0.1 um will affect the optical characteristics of a product. The amount of filled liquid crystal within a cell is an important factor affecting the stability of the cell thickness. In an actual producing process, a product quality is relatively easy to be affected by an excessive amount of liquid crystal, for example, an excessive amount of liquid crystal generally causes non-uniformity of picture and other defects.

SUMMARY OF THE INVENTION

One embodiment of the present invention provides a liquid crystal panel, comprising: an array substrate; a color filter substrate, facing the array substrate; a first sealant, disposed between the array substrate and the color filter substrate for attaching the array substrate and the color filter substrate, and a region surrounded by the first sealant forming a liquid crystal panel display region; liquid crystal, disposed in the liquid crystal display region between the array substrate and the color filter substrate; a liquid crystal buffer region, located at the outer side of the first sealant and between the array substrate and the color filter substrate, the liquid crystal buffer region being one or a plurality of vacuum chambers; a liquid crystal channel, disposed on the array substrate and/or the color filter substrate, the liquid crystal buffer region and the liquid crystal panel display region being connected through the liquid crystal channel; and a covering layer, covering at least a position where the liquid crystal channel connects with the liquid crystal panel display region, so as to block off a communication between the liquid crystal channel and the liquid crystal panel display region.

Another embodiment of the present invention provides a display, the display comprising a liquid crystal panel as described in the above embodiment.

Further another embodiment of the present invention provides a method for fabricating a liquid crystal panel, comprising: fabricating a liquid crystal channel on a surface of an array substrate and/or a color filter substrate to be in contact with liquid crystal; forming a covering layer on the liquid crystal channel; on one of the array substrate and the color filter substrate, applying a first sealant at edges of a liquid crystal panel display region, and applying a second sealant in a non-display region at the periphery of the liquid crystal panel display region; and on the other of the array substrate and the color filter substrate, dropping liquid crystal within the liquid crystal panel display region, and bonding the array substrate and the color filter substrate, so that the liquid crystal is filled between the array substrate and the color filter substrate within the liquid crystal panel display region surrounded by the first sealant, and that at least one vacuum liquid crystal buffer region is formed at the periphery of the liquid crystal display region, wherein the liquid crystal buffer region and the liquid crystal panel display region are connected through the liquid crystal channel, and the covering layer covers at least a position where the liquid crystal channel connects with the liquid crystal panel display region, so as to block off a communication between the liquid crystal channel and the liquid crystal panel display region.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
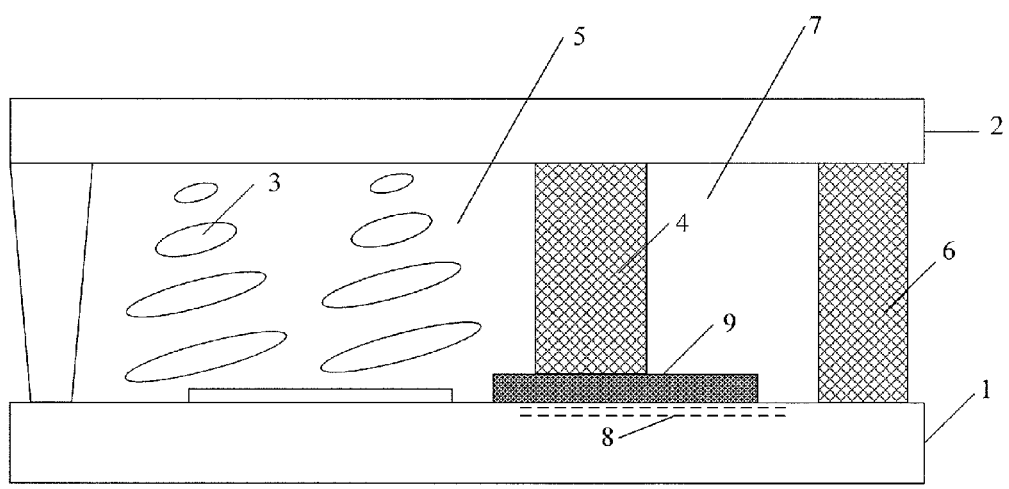
FIG. 1 is a schematic structural sectional view of a peripheral region of a liquid crystal panel in an embodiment of the present invention.
Figure 2:
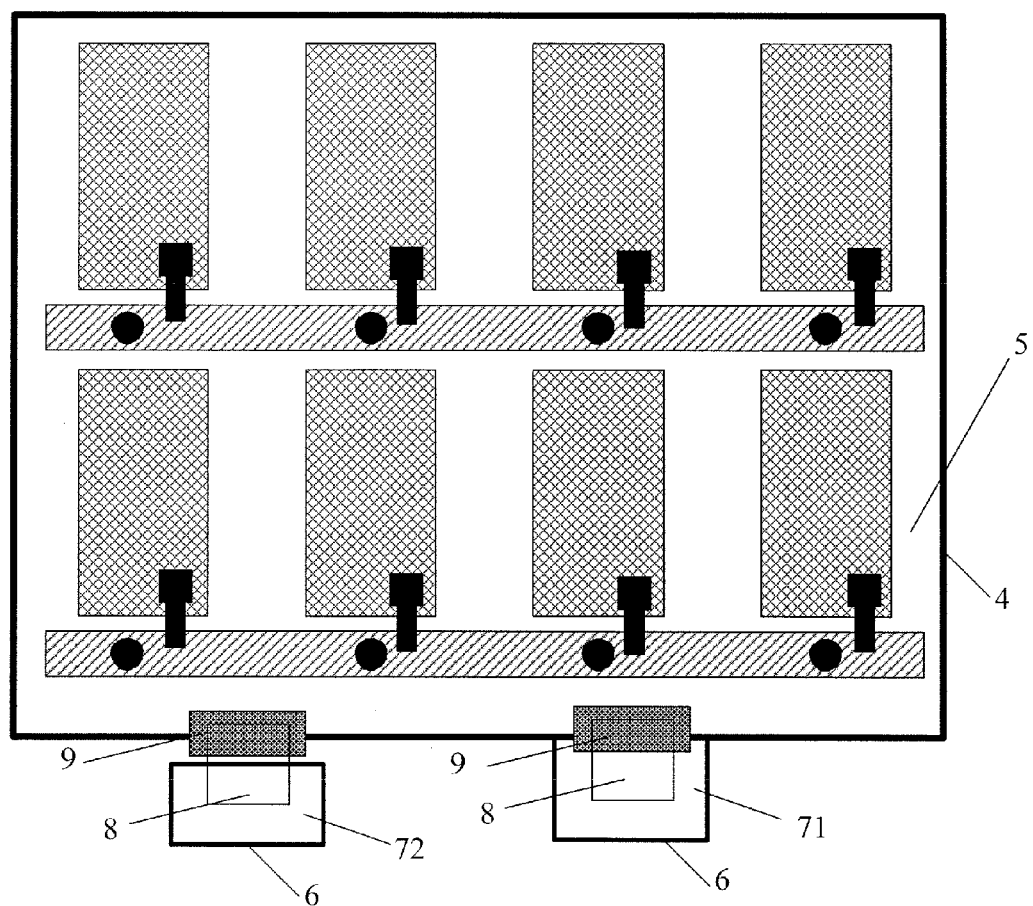
FIG. 2 is a schematic structural top view of a liquid crystal panel in an embodiment of the present invention.

In order to solve the existing problems of the prior art, an embodiment of the present invention provides a liquid crystal panel, as shown in FIG. 1, comprising: an array substrate 1; a color filter substrate 2 facing the array substrate 1; a first sealant 4 for attaching the array substrate 1 and the color filter substrate 2; and liquid crystal 3 located between the array substrate 1 and the color filter substrate 2. Between the array substrate 1 and the color filter substrate 2, a liquid crystal panel display region 5 is surrounded by the first sealant 4, as shown in FIG. 2. The array substrate 1 and the color filter substrate 2, by means of the first sealant 4, have the liquid crystal 3 filled within the liquid crystal panel display region 5. That is, the liquid crystal is filled within the liquid crystal panel display region 5 surrounded by the first sealant 4. The liquid crystal panel further comprises: at least one vacuum liquid crystal buffer region 7, located in a liquid crystal panel non-display region (at the outer side of the first sealant 4), and formed between the array substrate 1 and the color filter substrate 2; a liquid crystal channel 8, communicating the liquid crystal buffer region 7 and the liquid crystal panel display region 5, and disposed on the array substrate 1 and/or the color filter substrate 2; a covering layer 9, located at a position where the liquid crystal channel 8 connects with the liquid crystal panel display region 5, and blocking off a communication between the liquid crystal channel 8 and the liquid crystal panel display region 5.

When the amount of liquid crystal within the liquid crystal panel display region exceeds a predetermined threshold, it will lead to a non-uniform picture displayed by the liquid crystal panel. The liquid crystal panel provided by the embodiment of the present invention can solve this problem fairly well, and therefore improves the picture quality of the liquid crystal panel. As shown in FIG. 1, the liquid crystal panel is constituted by an array substrate 1, a color filter substrate 2 and liquid crystal 3, as well as other components. In the liquid crystal panel, the array substrate 1 and the color filter substrate 2 are connected by a first sealant 4, and a liquid crystal panel display region 5 filled with liquid crystal 3 is foamed; in a non-display region, the array substrate 1 and the color filter substrate 2 are connected by a second sealant 6, thus a vacuum liquid crystal buffer region 7 (for example, one or more vacuum chambers) is formed between the array substrate 1 and the color filter substrate 2 by the first sealant 4 and the second sealant 6. The liquid crystal buffer region 7 is connected with the liquid crystal panel display region 5 through a liquid crystal channel 8, and a covering layer 9 is formed at the connecting section, so as to block off a communication between the liquid crystal channel 8 and the liquid crystal panel display region 5, so that the liquid crystal 3 within the liquid crystal panel display region 5 can not pass through the liquid crystal channel 8 to flow to the liquid crystal buffer region 7. When the amount of liquid crystal within the liquid crystal panel display region 5 exceeds a predetermined threshold, a laser-cutting process and the like can be used to cut open the covering layer 9. In addition, there may be a plurality of liquid crystal buffer regions 7; therefore, when distributing the liquid crystal, all or part of the liquid crystal buffer regions 7 may be communicatively connected according to an actual situation. Since after dropping liquid crystal and bonding the array substrate 1 and the color filter substrate 2, the liquid crystal buffer region 7 forms a vacuum chamber; thus when distributing the liquid crystal, the liquid crystal can fill up a liquid crystal buffer region communicating with the liquid crystal panel display region 5, and does not generate bubbles.

FIG. 2 is a top view of a liquid crystal panel. In the figure, between an array substrate and a color filter substrate, a liquid crystal buffer region may be surrounded by a first sealant and a second sealant, and also may be surrounded by a second sealant. A liquid crystal buffer region 71 is a space surrounded by a second sealant 6 and a first sealant 4, and a liquid crystal buffer region 72 is a separate space surrounded by the second sealant 6. Both the liquid crystal buffer region 71 and the liquid crystal buffer region 72 are connected with the liquid crystal panel display region 5 through the liquid crystal channel 8, and a covering layer 9 blocks off the communication between the liquid crystal channel 8 and the liquid crystal panel display region 5. The material of the covering layer 9 is a resin material. For example, the covering layer 9 may be formed of a material that can be fused by laser.

Figure 3:
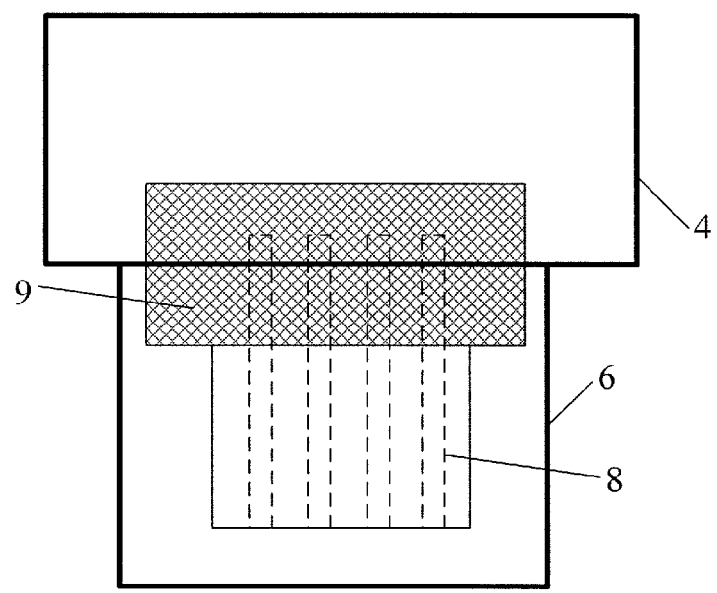
FIG. 3 is a schematic structural view of a liquid crystal channel in an embodiment of the present invention.

The above-described liquid crystal channel 8 may be located on the array substrate 1 and/or the color filter substrate 2, for example, the liquid crystal channel 8 may be at least one groove on a surface of the array substrate 1 in contact with the liquid crystal 3; the liquid crystal channel 8 may also be at least one groove on a surface of the color filter substrate 2 in contact with the liquid crystal 3. As shown in FIG. 3, strip-like grooves constituted by the broken lines are liquid crystal channels 8, and there may have a plurality of channels. A resin material may cover on the liquid crystal channels 8 to form the covering layer 9, so that it may block off a communication between the liquid crystal channel 8 and the liquid crystal panel display region 5.

In one embodiment, the liquid crystal channel 8 extends across the first sealant 4, that is, extends from the liquid crystal panel display region 5 to the liquid crystal buffer region 7. For example, the covering layer 9 at least covers the part of the liquid crystal channel 8 locating in the liquid crystal display region 5, so as to block off the liquid crystal channel 8, and to prevent the liquid crystal in a normal state from flowing into the liquid crystal buffer region 7. In order to better prevent a communication between the liquid crystal channel 8 and the liquid crystal panel display region, the coverage area of the covering layer 9 may also be larger than the part of the liquid crystal channel 8 within the liquid crystal panel display region 5. As shown in FIG. 2, the covering layer 9 may cover a part of the liquid crystal channel 8 within the liquid crystal panel display region 5, as well as a region around the part. Specifically, the covering layer 9 may cover part of the region within the liquid crystal panel display region 5, part of the region of the first sealant 4, as well as part of the region at the outer side of the first sealant 9. When the amount of liquid crystal within the liquid crystal display region 7 exceeds a predetermined threshold, a laser-cutting process and the like can be used to cut open the covering layer 9, so that the liquid crystal channel 8 is at least partly exposed both in the liquid crystal panel display region 5 and in the liquid crystal buffer region 7, thus a fluid communication can be established between the liquid crystal panel display region 8 and liquid crystal buffer region 7. For example, the covering layer 9 may be formed of a material that can be fused by laser. That is, the liquid crystal channel 8 extends from the liquid crystal display region 5 to the liquid crystal buffer region 7. and therefore, when there is no covering layer 9 for blocking or the covering layer 9 is fused, a fluid communication can be established between the liquid crystal display region 5 and the liquid crystal buffer region 7.

In addition, although the covering layer 9 in FIG. 2 is shown as across the display region 5, the second sealant 4 and the non-display region, the technical solution of the present invention is not limited thereto. As long as the covering layer 9 covers at least a part of the liquid crystal channel 8 locating in the display region 5, so as to block off the fluid communication between the liquid crystal channel 8 and the display region 5, the region of the covering layer 9 may be provided at will according to an actual situation.

Through the above description, it can be seen that, with the liquid crystal panel provided by the embodiment of the present invention, by fabricating a liquid crystal channel on a surface of a substrate in contact with liquid crystal, and forming a covering layer, and then after bonding the array substrate and the color filter substrate with a second sealant, a vacuum liquid crystal buffer region for distributing the liquid crystal, which is connected with the liquid crystal panel display region through the liquid crystal channel, is formed. When the amount of liquid crystal within the liquid crystal panel display region exceeds a predetermined threshold, a communication is established between the liquid crystal channel and the liquid crystal display region, so that the liquid crystal can fill up the liquid crystal buffer region, and does not generate bubbles. Thus, an excessive amount of liquid crystal within the liquid crystal panel display region is reduced, and the picture uniformity is improved.

Based on the same inventive idea, an embodiment of the present invention also provides a display comprising the above-described liquid crystal panel.

Based on the same inventive idea, an embodiment of the present invention further provides a method for fabricating a liquid crystal panel, the method comprises the following steps:

Step 401, fabricating a liquid crystal channel on a surface of an array substrate and/or a color filter substrate to be in contact with liquid crystal;

Step 402, forming a covering layer on the liquid crystal channel;

Step 403, on one of the array substrate and the color filter substrate, applying a first sealant at the edges of a liquid crystal panel display region, and applying a second sealant in a non-display region at the periphery of the liquid crystal panel display region;

Step 404, on the other of the array substrate and the color filter substrate, dropping liquid crystal within the liquid crystal panel display region, and bonding the array substrate and the color filter substrate, so that the liquid crystal is filled between the array substrate and the color filter substrate within the liquid crystal panel display region surrounded by the first sealant, and that at least one vacuum liquid crystal buffer region is formed at the periphery of the liquid crystal display region.

In the above-described method, the liquid crystal buffer region and the liquid crystal panel display region are connected through the liquid crystal channel, and the covering layer at least covers the position where the liquid crystal channel connects with the liquid crystal panel display region, so as to block off the communication between the liquid crystal channel and the liquid crystal panel display region.

For example, the liquid crystal buffer region is composed of a region surrounded by the first sealant and the second sealant together, or composed of a region surrounded by the second sealant.

Specifically, different processes may be adopted to fabricate the liquid crystal channel on a surface of the array substrate and/or the color filter substrate in contact with liquid crystal, so as to connect the display region and the liquid crystal buffer region. For example, when fabricating a liquid crystal channel on a surface of the array substrate in contact with the liquid crystal, firstly, fabricating a gate layer, a gate insulating layer, a source-drain layer and a passivation layer in this order on a glass substrate; then, through a via-hole process, fabricating one or more grooves as liquid crystal channels on an upper surface of the passivation layer. When fabricating a liquid crystal channel on a surface of the color filter substrate in contact with the liquid crystal, firstly, fabricating a black matrix and a color filter resin on a glass substrate; during fabricating the black matrix or the color filter resin, forming a resin for non-display region in a non-display region of the glass substrate; then, through an etching process, fabricating one or more grooves as liquid crystal channels on a surface of the black matrix or the resin in the display region or in the non-display region; alternatively, forming a planarization layer on the black matrix and the color filter resin, and then fabricating one or more grooves as liquid crystal channels on a surface of the planarization layer,.

After fabricating the liquid crystal channels, a resin material covering on at least part of the liquid crystal channels is made by a printing process to form a covering layer, so as to block off the communication between the liquid crystal channel and the liquid crystal panel display region. After both the array substrate and the color filter substrate are fabricated completely, applying a first sealant at the edges of a display region of the array substrate and/or the color filter substrate, and applying a second sealant in a non-display region of the array substrate and/or the color filter substrate. In this way, by bonding the array substrate and the color filter substrate with the first sealant, a liquid crystal panel display region for filling with liquid crystal is formed; by bonding the array substrate and the color filter substrate with the second sealant, a liquid crystal buffer region for distributing the liquid crystal is formed, the liquid crystal buffer region being connected with the liquid crystal panel display region through the liquid crystal channel. In addition, there may be a plurality of liquid crystal buffer regions; therefore, when distributing the liquid crystal, all or part of the liquid crystal buffer regions may be communicatively connected according to an actual situation. Since after bonding the array substrate and the color filter substrate, the liquid crystal buffer region is formed as a vacuum region; therefore, when the amount of liquid crystal within the liquid crystal panel display region exceeds a predetermined threshold, by cutting open the covering layer through a laser-cutting process, the liquid crystal can fill up the liquid crystal buffer region communicating with the liquid crystal panel display region, and does not generate bubbles. A specific structure of the liquid crystal buffer region may refer to FIG. 2, which will not be described repeatedly.

By taking the case of fabricating a liquid crystal channel on an array substrate as an example, a method for fabricating a liquid crystal panel provided by an embodiment of the present invention may comprise, for example, the following steps:

Step 501, fabricating a gate layer on a glass substrate;

Step 502, forming a gate insulating layer on the gate layer;

Step 503, forming a source-drain layer;

Step 504, forming a passivation layer, and forming a plurality of grooves on the passivation layer through a via-hole process;

Step 505, covering a resin on the plurality of grooves through a printing process;

Step 506, on an array substrate, applying a first sealant at the edges of a display region, and applying a second sealant in a liquid crystal panel non-display region;

Step 507, on a color filter substrate, dropping liquid crystal in the display region;

Step 508, bonding the color filter substrate and the array substrate.

After bonding the array substrate and the color filter substrate with the second sealant as described above, a liquid crystal buffer region for distributing the liquid crystal is formed, the liquid crystal buffer region being connected with the display region through the grooves. In addition, there may be a plurality of liquid crystal buffer region; therefore, when distributing the liquid crystal, all or part of the liquid crystal buffer regions may be communicatively connected according to an actual situation. Since after dropping liquid crystal and bonding the array substrate and the color filter substrate, the liquid crystal buffer region is formed as a vacuum region, when the amount of liquid crystal within the display region exceeds a predetermined threshold, by cutting open the covering layer through a laser-cutting process for distributing the liquid crystal, the communication between the liquid crystal channel communicate with the liquid crystal panel display region is established. Thus, the liquid crystal can fill up the liquid crystal buffer region, and does not generate bubbles.

Through the above description, it can be seen that, with the liquid crystal panel and the fabricating method thereof and the display provided by the embodiments of the present invention, by fabricating a liquid crystal channel on a surface of a substrate in contact with liquid crystal, and applying a covering layer, and then after bonding the array substrate and the color filter substrate with a second sealant, a vacuum liquid crystal buffer region for distributing the liquid crystal, which is connected with the liquid crystal panel display region through the liquid crystal channel, is formed. When the amount of liquid crystal within the liquid crystal panel display region is excessive, by cutting open the covering layer through a laser-cutting process, the liquid crystal can fill up the liquid crystal buffer region, and does not generate bubbles. Thus the amount of liquid crystal within the liquid crystal panel display region is reduced, and the picture uniformity is improved.

Those skilled in the art can make various alterations and modifications to the embodiments of the present invention without departing from the spirit and scope of the present invention, and therefore these alterations and modifications should be included within the protection scope of the present invention.

What is claimed is:

1. A liquid crystal panel, comprising:
    an array substrate;
    a color filter substrate, facing the array substrate;
    a first sealant, disposed between the array substrate and the color filter substrate for attaching the array substrate and the color filter substrate, and a region surrounded by the first sealant forming a liquid crystal panel display region;
    liquid crystal, disposed in the liquid crystal display region between the array substrate and the color filter substrate;
    a liquid crystal buffer region, located at the outer side of the first sealant and between the array substrate and the color filter substrate, the liquid crystal buffer region being one or a plurality of vacuum chambers;
    a liquid crystal channel, disposed on the array substrate and/or the color filter substrate, the liquid crystal buffer region and the liquid crystal panel display region being connected through the liquid crystal channel, the liquid crystal channel being at least one groove on a surface of the array substrate and/or the color filter substrate in contact with the liquid crystal; and
    a covering layer, covering at least a position where the liquid crystal channel connects with the liquid crystal panel display region, so as to block off a communication between the liquid crystal channel and the liquid crystal panel display region.

2. The liquid crystal panel according to claim 1, wherein a second sealant is disposed at the outer side of the first sealant; the liquid crystal buffer region between the array substrate and the color filter substrate is composed of a region surrounded by the first sealant and the second sealant together, or composed of a region surrounded by the second sealant.

3. The liquid crystal panel according to claim 1, wherein the groove is a strip-like groove.

4. The liquid crystal panel according to claim 1, wherein the liquid crystal channel extends across the first sealant, and extends from the liquid crystal panel display region to the liquid crystal buffer region.

5. The liquid crystal panel according to claim 1, wherein the material of the covering layer is a resin material.

6. The liquid crystal panel according to claim 1, wherein the covering layer is formed of a material that can be fused by laser.

7. A display, comprising: a liquid crystal panel in accordance with claim 1.

8. A method for fabricating a liquid crystal panel, comprising:
    fabricating a liquid crystal channel on a surface of an array substrate and/or a color filter substrate to be in contact with liquid crystal, the liquid crystal channel being at least one groove on a surface of the array substrate and/or the color filter substrate in contact with the liquid crystal;
    forming a covering layer on the liquid crystal channel;
    on one of the array substrate and the color filter substrate, applying a first sealant at edges of a liquid crystal panel display region, and applying a second sealant in a non-display region at the periphery of the liquid crystal panel display region; and
    on the other of the array substrate and the color filter substrate, dropping liquid crystal within the liquid crystal panel display region, and bonding the array substrate and the color filter substrate, so that the liquid crystal is filled between the array substrate and the color filter substrate within the liquid crystal panel display region surrounded by the first sealant, and that at least one vacuum liquid crystal buffer region is formed at the periphery of the liquid crystal display region,
    wherein the liquid crystal buffer region and the liquid crystal panel display region are connected through the liquid crystal channel, and the covering layer covers at least a position where the liquid crystal channel connects with the liquid crystal panel display region, so as to block off a communication between the liquid crystal channel and the liquid crystal panel display region.

9. The method according to claim 8, wherein the liquid crystal buffer region is composed of a region surrounded by the first sealant and the second sealant together, or composed of a region surrounded by the second sealant.

10. The method according to claim 8, wherein fabricating a liquid crystal channel on a surface of the array substrate to be in contact with liquid crystal comprises:
    fabricating a gate layer, a gate insulating layer, a source-drain layer and a passivation layer in this order on a glass substrate; and
    fabricating one or more grooves as liquid crystal channels on an upper surface of the passivation layer through a via-hole process.

11. The method according to claim 8, wherein fabricating a liquid crystal channel on a surface of the color filter substrate to be in contact with liquid crystal comprises:
    fabricating a black matrix and a color filter resin on a glass substrate;
    during fabricating the black matrix or the color filter resin, forming a resin for a non-display region in a non-display region of the glass substrate; and
    through an etching process, fabricating one or more grooves as liquid crystal channels on a surface of the black matrix or the resin in the display region and in the non-display region; or, forming a planarization layer on the black matrix and the color filter resin, and fabricating one or more grooves as liquid crystal channels on a surface of the planarization layer.

12. The method according to claim 8, wherein forming a covering layer on the liquid crystal channel comprises: covering a resin material on the grooves to form a covering layer, so as to block off the communication between the liquid crystal channel and the liquid crystal panel display region.

13. The method according to claim 8, wherein the covering layer is formed of a material that can be fused by laser.

* * * * *